Patented June 20, 1939

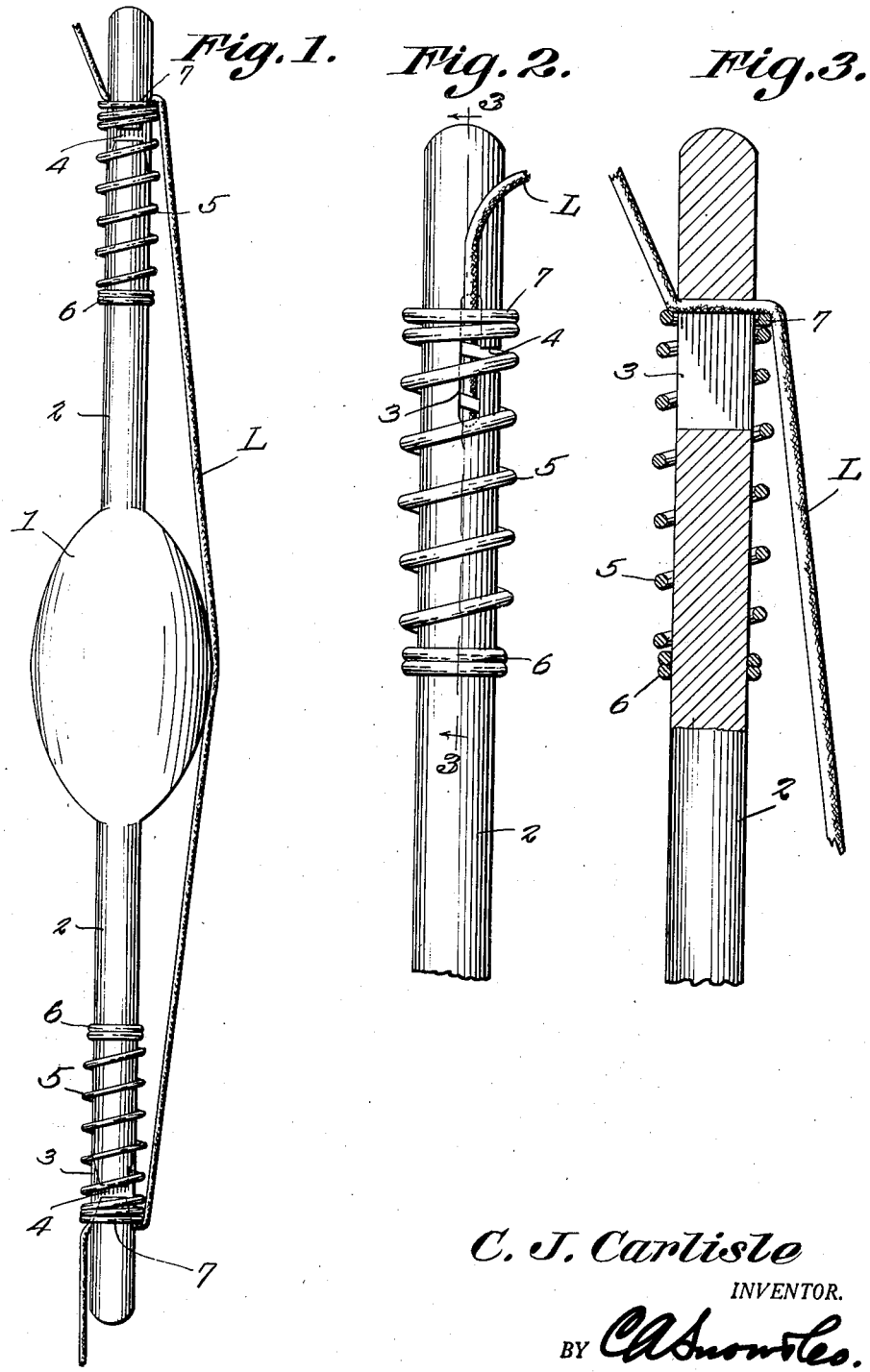

2,163,483

UNITED STATES PATENT OFFICE 2,163,483

FLOAT

Charles J. Carlisle, Coldwater, Mich.

Application July 7, 1938, Serial No. 217,998

3 Claims. (Cl. 43—49)

This invention relates to fishing floats or bobs and more particularly to means whereby the line can be attached to the float.

An object of the invention is to provide in the stem of the float a line receiving slot open at the side, there being a coiled spring mounted on the stem and one end of which constitutes a means for binding the line against one end of the slot thereby to hold it securely to the float and at the same time provide a means whereby the line can be quickly detached.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

In the accompanying drawing the preferred form of the invention has been shown.

In said drawing: Figure 1 is an elevation of a float equipped with the present improvement.

Figure 2 is an elevation of a portion thereof viewed at right angles to Figure 1.

Figure 3 is a longitudinal section on the line 3—3 of Figure 2.

Referring to the figures by characters of reference 1 designates a float or bob having the usual stems 2 projecting in opposite directions therefrom.

In the present construction each of these stems is provided near its free end with a longitudinal slot 3 and one side wall of the slot is intersected at a point between its ends by a lateral slot 4 opening through the side of the stem.

Mounted on each stem adjacent to the slot 3 is a coiled spring 5. The convolutions at one end of this spring are so proportioned as to tightly grip the stem as indicated at 6, thus to hold the spring against sliding bodily movement along the stem. Under normal conditions, when the spring is fully expanded, it extends along the stem and past the slot 3.

When it is desired to attach a line L to the float, said line is inserted laterally through the side slot 4 and into the longitudinal slot 3 but before this is done the spring 5 is compressed so that it will not surround any portion of the slot 3. Thereafter the spring is released and will expand against that portion of the line in the slot, binding it tightly against the adjacent end wall of the slot as shown clearly in Figure 3. Thus the line will be held securely to the float and cannot be detached therefrom unless the spring is placed under compression to move its free end past the side slot 4, thereby to allow the line to be withdrawn through said slot.

It will be noted that this device is simple and inexpensive in construction but nevertheless provides not only a means for securely holding the line to the float but also a means for permitting quick detachment of the float from the line. No supplemental means such as plungers, latches or the like are necessary. The retaining spring constitutes the line clamp per se. It is to be understood of course that this spring will be made of a metal which will not be effected by water.

Only the convolutions 6 are designed to grip the stem 2. The other convolutions of each spring are sufficiently large to move freely along the stem. The convolution 7 at the free end of the spring is preferably closed so that the line will not become entangled therewith.

What is claimed is:

1. The combination with a float having a stem, there being a line receiving slot in the stem having a side slot opening thereinto, of a coiled spring having a convolution at one end gripping the stem, said spring being normally expanded to extend beyond both ends of the slot, the convolutions of the spring at the free end thereof constituting means for engaging a line in the slot and binding it against one end wall of said slot.

2. The combination with a float having a stem, there being a slot in the stem open at one side, of a coiled spring mounted on the stem and anchored thereto at one end, said slot constituting means for receiving a line extended entirely outside of the spring, the convolution at the other end of the spring constituting means for engaging a portion of the line and binding it against one end of the slot at a point removed from the opening in the side thereof.

3. The combination with a float having a stem, there being a line receiving slot in the stem provided with a side opening, of a coiled spring secured to the stem and cooperating with one end wall of the slot to fasten a line to the stem, said spring having a convolution at one end for tightly gripping the stem to hold the spring thereto, the remaining convolutions being proportioned to slide freely on the stem.

CHARLES J. CARLISLE.